US008115632B1

(12) United States Patent
Rahimi et al.

(10) Patent No.: US 8,115,632 B1
(45) Date of Patent: Feb. 14, 2012

(54) RFID TAG CAPABLE OF MODIFYING INTERNAL OPERATIONS FOR A SENSED ENVIRONMENT

(75) Inventors: Kambiz Rahimi, Bellevue, WA (US); Christopher J. Diorio, Shoreline, WA (US)

(73) Assignee: Impinj, Inc,, Seattle, WA (US)

( * ) Notice: Subject to any disclaimer, the term of this patent is extended or adjusted under 35 U.S.C. 154(b) by 508 days.

(21) Appl. No.: 12/370,503

(22) Filed: Feb. 12, 2009

Related U.S. Application Data

(60) Provisional application No. 61/028,644, filed on Feb. 14, 2008.

(51) Int. Cl.
*G08B 13/14* (2006.01)
(52) U.S. Cl. .................. 340/572.1; 340/10.1
(58) Field of Classification Search ............ 340/572.1
See application file for complete search history.

(56) References Cited

U.S. PATENT DOCUMENTS

| | | | |
|---|---|---|---|
| 6,989,750 B2 * | 1/2006 | Shanks et al. | 340/572.4 |
| 7,432,825 B2 * | 10/2008 | Chan et al. | 340/870.17 |
| 2006/0022058 A1 * | 2/2006 | Akiyama et al. | 235/492 |
| 2006/0197668 A1 * | 9/2006 | Oliver et al. | 340/572.4 |
| 2006/0273182 A1 * | 12/2006 | Iwata | 235/492 |
| 2008/0001725 A1 * | 1/2008 | White et al. | 340/10.51 |
| 2008/0197978 A1 * | 8/2008 | Diorio et al. | 340/10.1 |
| 2008/0197979 A1 * | 8/2008 | Enyedy et al. | 340/10.1 |

OTHER PUBLICATIONS

EPCglobal, Inc "Specification of RFID Air Interface-EPC Radio-Frequency Identity Protocols Class-1 Generation-2 UHF RFID Protocol for Communications at 860 MHz-960 MHz, Version 1.0.8." (a.k.a. "The Gen 2 Spec") EPCglobal Inc. Dec. 14, 2004, http://www.epcglobalinc.org.
EPCglobal, Inc "Specification of RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec") EPCglobal Inc. Dec. 17, 2005, http://www.epcglobalinc,org.
Azadegan et al., "Miniature High-Q Double-Spiral Slot-Line Resonator Filters", IEEE Transactions on Microwave Theory and Techniques, vol. 52, No. 5, May 2004.
"Dipole Antenna", on Wikipedia, 10 pages http://en.wikipedia.org/wiki/Dipole_antenna, Oct. 7, 2007.

* cited by examiner

*Primary Examiner* — George Bugg
*Assistant Examiner* — Kerri McNally
(74) *Attorney, Agent, or Firm* — Turk IP Law, LLC

(57) ABSTRACT

A semiconductor chip for an RFID tag is described. The semiconductor chip including wireless transceiver and processing block circuitry to receive and put into effect a wirelessly received instruction encoded in a TUNE command. The instruction commanding the semiconductor chip to perform at least one specific act. The semiconductor chip having circuitry to perform the at least one specific act. The circuitry being coupled to the processing block. The circuitry and its corresponding specific act identified by at least one of the following: enablement circuitry to turn a sub-circuit within the semiconductor chip on; disablement circuitry to turn a sub-circuit within the semiconductor chip off; current bias circuitry to alter a bias current within a sub-circuit of the semiconductor chip; voltage bias circuitry to alter a bias voltage within a sub-circuit of the semiconductor chip; threshold adjustment circuitry to adjust a threshold within a sub-circuit of the semiconductor chip.

19 Claims, 10 Drawing Sheets

RFID READER SYSTEM DETAIL

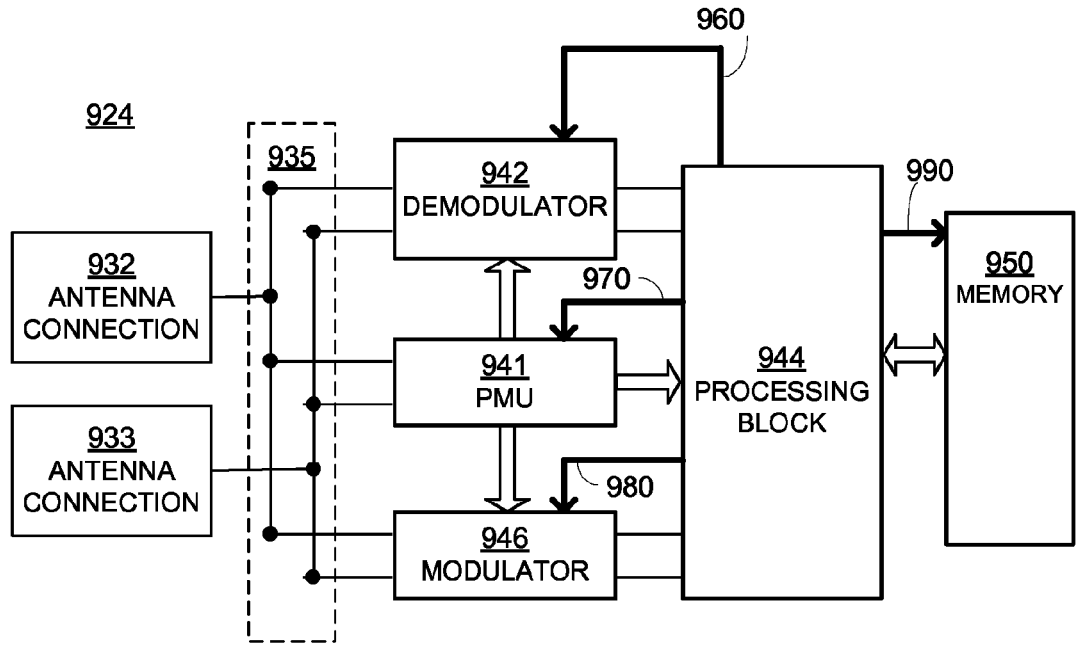
FIG. 9A  *RFID TAG COMPONENTS*
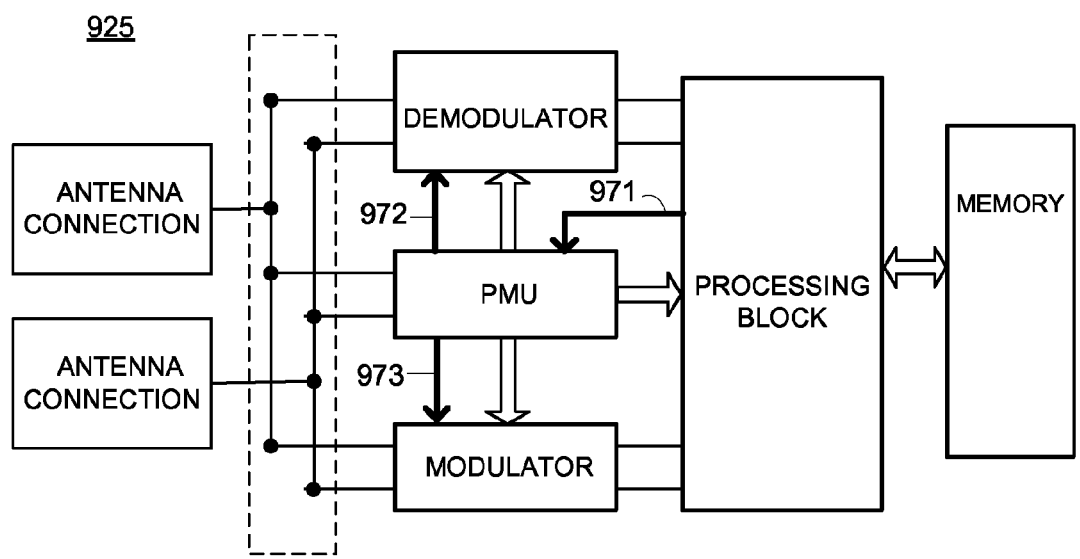
FIG. 9B  *RFID TAG COMPONENTS*

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.17 - SELECT COMMAND OF THE GEN2 SPEC VERSION 1.1.0*

FIG. 10A

| | Membank | Pointer | Length | Mask | | | | FCF | |
|---|---|---|---|---|---|---|---|---|---|
| | | | | Subfield_1 | FEF | ... | Subfield_N | Command code | Data |
| # of bits | 2 | EBV | 8 | Variable | Variable | | Variable | 5 | Variable |
| description | – | – | – | – | – | | – | – | – |

*SUBDIVIDING THE MASK FIELD*

FIG. 10B

| | Membank | Pointer | Length | Mask | | | | FCF | |
|---|---|---|---|---|---|---|---|---|---|
| | | | | Class ID | FEF | MDID | Indicator | Command code | Data |
| # of bits | 2 | EBV | 8 | 2 | 12 | 1 | 5 | Variable |
| description | 10 | 06h | 14h | 10 | 000000000001 | 1 | 00000 | – |

*EXAMPLE*

FIG. 10C

RFID TAG CAPABLE OF MODIFYING INTERNAL OPERATIONS FOR A SENSED ENVIRONMENT

CLAIM OF PRIORITY

The present application claims priority to and the benefit of the filing date of U.S. Provisional Application Ser. No. 61/028,644 filed on Feb. 14, 2008.

FIELD OF INVENTION

The present description addresses the field of Radio Frequency IDentification (RFID) systems, and more specifically to causing such systems to an RFID tag capable of modifying internal operations for a sensed environment.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader reads a tag code, data can be learned about the associated item that hosts the tag, and/or about the tag itself.

An RFID tag typically includes an antenna system, a radio section, a power management section, an oscillator, and frequently a logical section, a memory, or both. In earlier RFID tags, the power management section included an energy storage device, such as a battery. RFID tags with a battery are known as active or semi-active tags. Advances in semiconductor technology have miniaturized the electronics so much that an RFID tag can be powered solely by the RF signal it receives. Such RFID tags do not include a battery, and are called passive tags.

A well-known problem in RFID systems is expedience in reading the tags, especially where it is desired to read more than one of the codes stored in each tag. The problem becomes exacerbated if there are many tags, or the host items are moving and thus allow only limited time to read their tags.

SUMMARY

A semiconductor chip for an RFID tag is described. The semiconductor chip including wireless transceiver and processing block circuitry to receive and put into effect a wirelessly received instruction encoded in a TUNE command. The instruction commanding the semiconductor chip to perform at least one specific act. The semiconductor chip having circuitry to perform the at least one specific act. The circuitry being coupled to the processing block. The circuitry and its corresponding specific act identified by at least one of the following: enablement circuitry to turn a sub-circuit within the semiconductor chip on; disablement circuitry to turn a sub-circuit within the semiconductor chip off; current bias circuitry to alter a bias current within a sub-circuit of the semiconductor chip; voltage bias circuitry to alter a bias voltage within a sub-circuit of the semiconductor chip; threshold adjustment circuitry to adjust a threshold within a sub-circuit of the semiconductor chip.

BRIEF DESCRIPTION OF THE DRAWINGS

The following Detailed Description proceeds with reference to the accompanying Drawings, in which:

FIG. 9A is a diagram illustrating a first embodiment of an RFID tag semiconductor chip that is capable of receiving and performing an instruction to perform a specific act on a sub-circuit of the semiconductor chip.

FIG. 9B is a diagram illustrating a second embodiment of an RFID tag semiconductor chip that is capable of receiving and performing an instruction to perform a specific act on a sub-circuit of the semiconductor chip.

FIG. 10A is a table illustrating the fields of the Select command of the Gen2 Spec version 1.1.0, versions of which may be used as any one or more of the commands from an RFID reader system component according to embodiments.

FIG. 10B is a table illustrating how a number of custom commands can be enabled in a reader and a tag.

FIG. 10C is a table showing sample values that can be used for the table of FIG. 10B.

DETAILED DESCRIPTION

Figure 1:
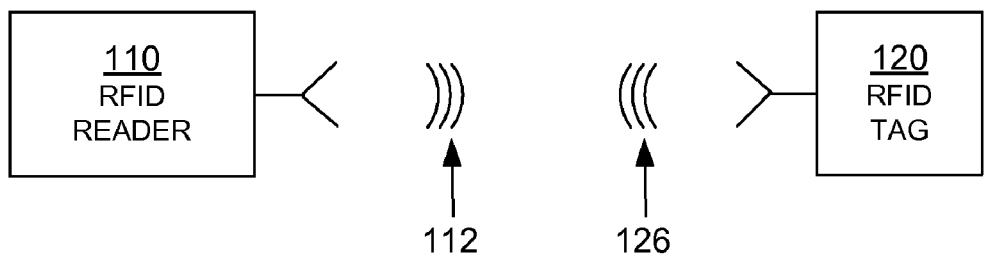
FIG. 1 is a block diagram of components of an RFID system.

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be passive or semi-active or active, i.e. having its own power source. Where tag 120 is a passive tag, it is powered from wave 112.

Figure 2:
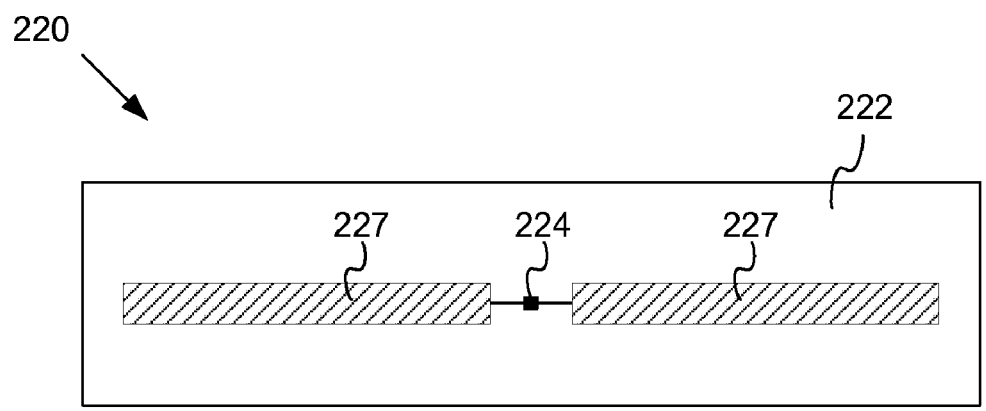
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
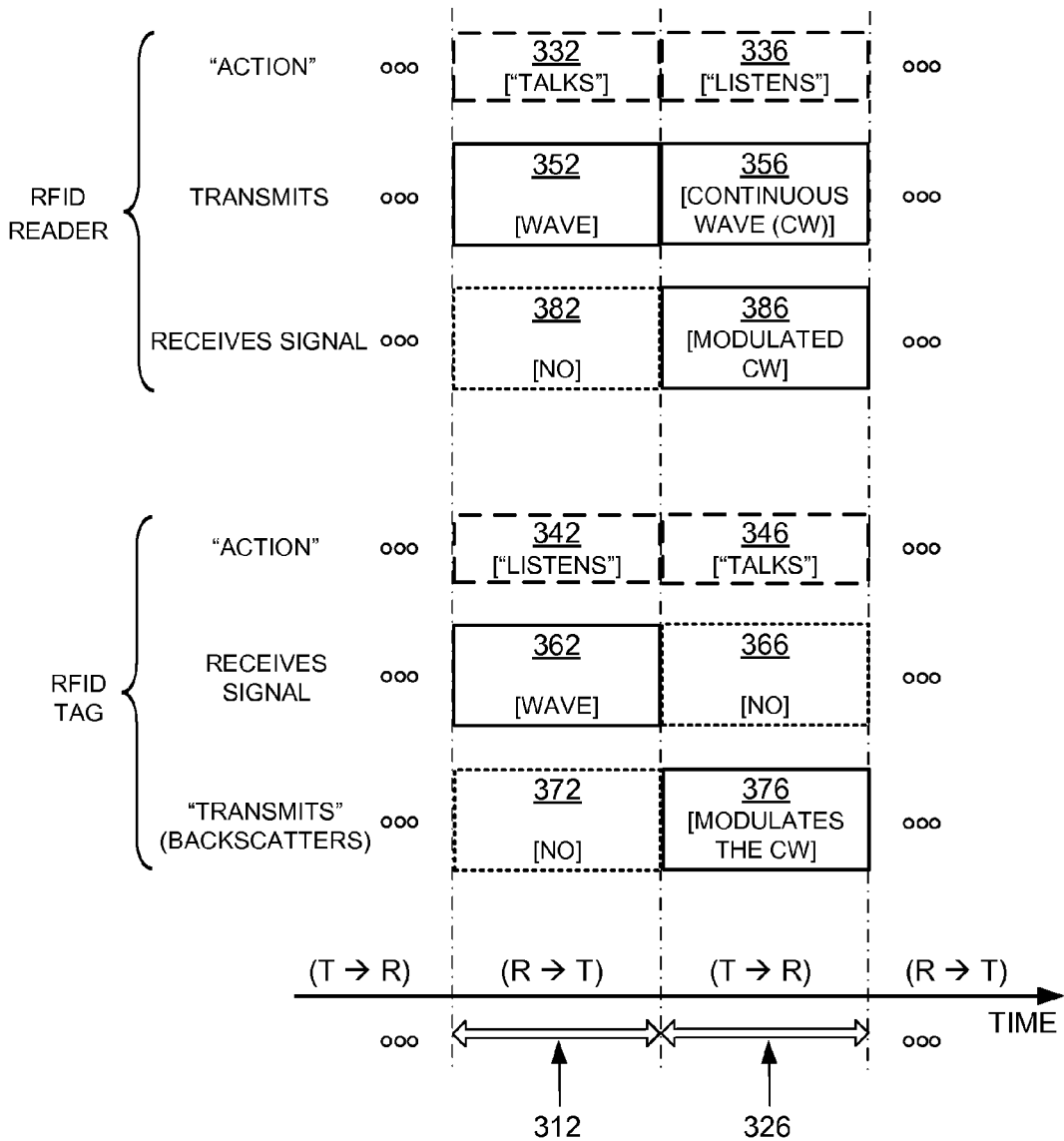
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO. Version 1.1.0 of the Gen2 Spec is hereby incorporated by reference in its entirety.

In addition, a protocol can be a variant of a stated specification such as the Gen2 Spec, for example including fewer or additional commands than the stated specification calls for, and so on. In such instances, additional commands are sometimes called custom commands.

Figure 4:
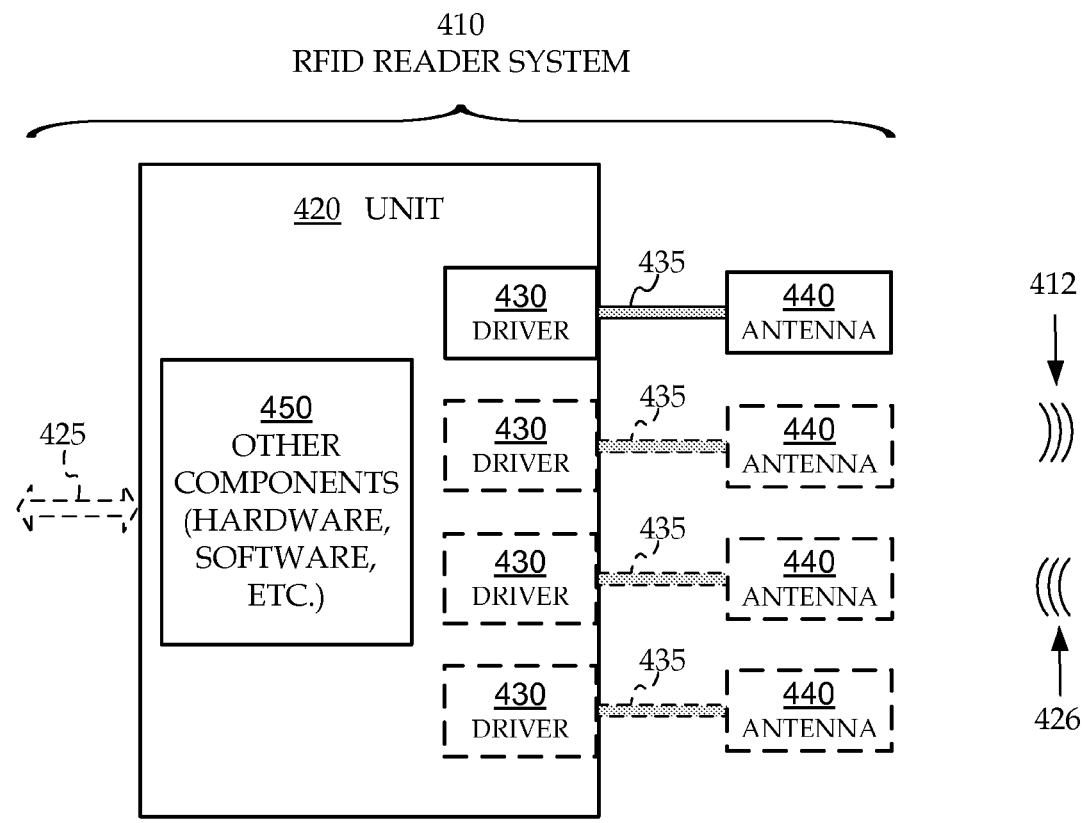
FIG. 4 is a block diagram showing a detail of an RFID reader system, such as the one shown in FIG. 1.

FIG. 4 is a block diagram showing a detail of an RFID reader system 410, which can be the same as reader 110 shown in FIG. 1. A unit 420 is also known as a box 420, and has one or more antenna drivers 430. In some embodiments it has four drivers 430. For each driver 430 there is an output connector. The output connector is typically for a coaxial cable. Accordingly, connectors 435 can be attached to the outputs of the provided respective drivers 430, and then connectors 435 can be attached to respective antennas 440.

A driver 430 can send to its respective antenna 440 a driving signal that is in the RF range, which is why connector 435 is typically but not necessarily a coaxial cable. The driving signal causes the antenna 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 is received by an antenna 440 and ultimately becomes a signal sensed by unit 420.

Unit 420 also has other components 450, such as hardware and/or software and/or firmware, which may be described in more detail later in this document. Components 450 control drivers 430, and as such cause RF wave 412 to be transmitted, and the sensed backscattered RF wave 426 to be interpreted. Optionally and preferably there is a communication link 425 to other equipment, such as computers and the like, for remote operation of system 410.

Figure 5:
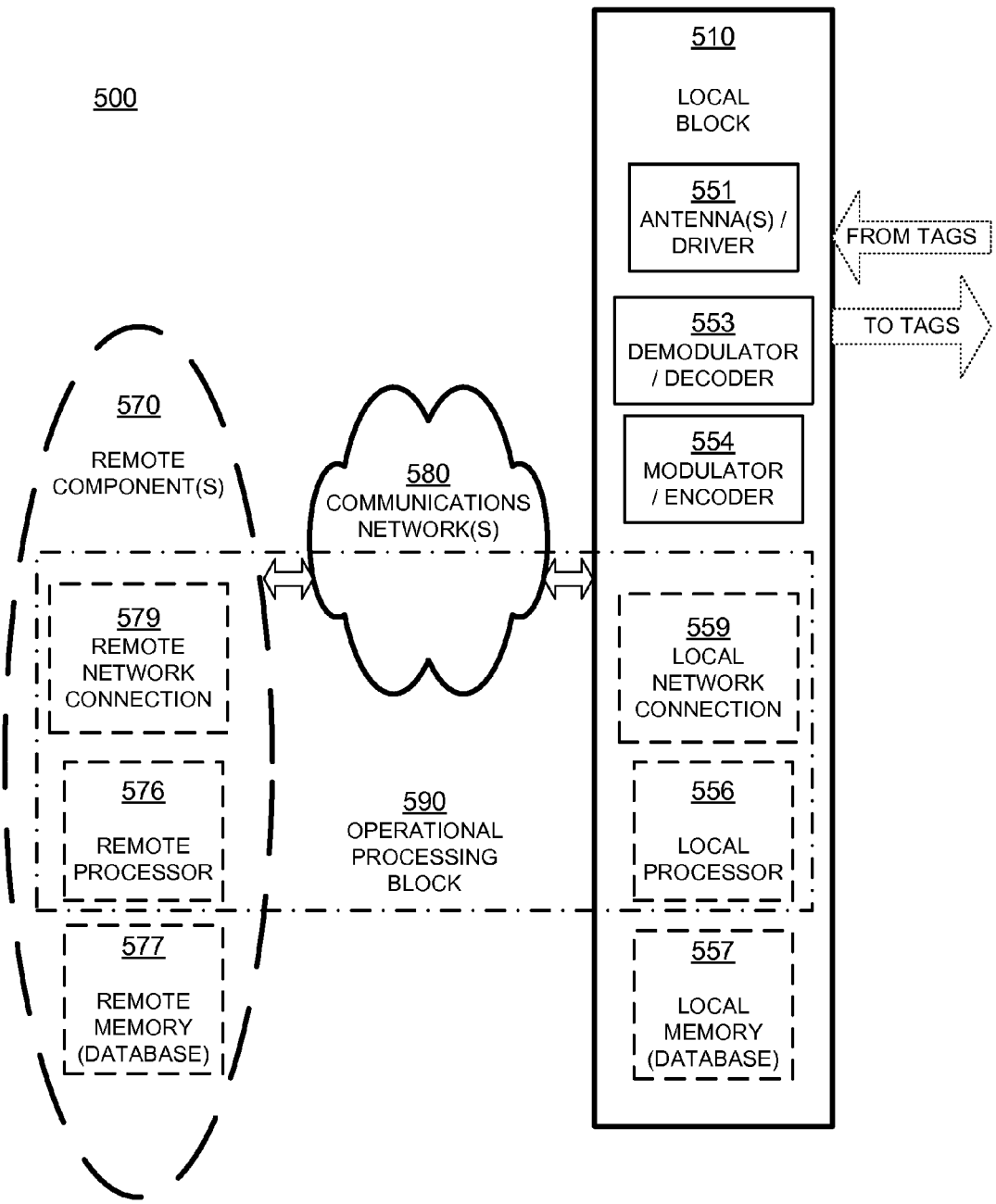
FIG. 5 is a block diagram of a whole RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1. Plus, local block 510 can be unit 420 of FIG. 4.

Local block 510 is responsible for communicating with the tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 553, the encoding function in block 554, or both, may be performed instead by processor 556.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. Memory 557, if provided, can include programs for processor 556 to run, if provided.

In some embodiments, memory 557 stores data read from tags, or data to be written to tags, such as Electronic Product Codes (EPCs), Tag Identifiers (TIDs) and other data. Memory 557 can also include reference data that is to be compared to the EPC codes, instructions and/or rules for how to encode commands for the tags, modes for controlling antenna 551, and so on. In some of these embodiments, local memory 557 is provided as a database.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, or a mere local communication link, such as a USB, PCI, and so on. In turn, local block 510 then includes a local network connection 559 for communicating with network 580.

There can be one or more remote component(s) 570. If more than one, they can be located at the same location, or in different locations. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs.

Of the above-described elements, it is advantageous to consider a combination of these components, designated as operational processing block 590. Block 590 includes those that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna 551, and cause antenna 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data.

Reader system 500 operates by block 590 generating communications for RFID tags. These communications are ultimately transmitted by antenna block 551, with modulator/encoder block 554 encoding and modulating the information on an RF wave. Then data is received from the tags via antenna block 551, demodulated and decoded by demodulator/decoder block 553, and processed by processing block 590.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

Figure 6:
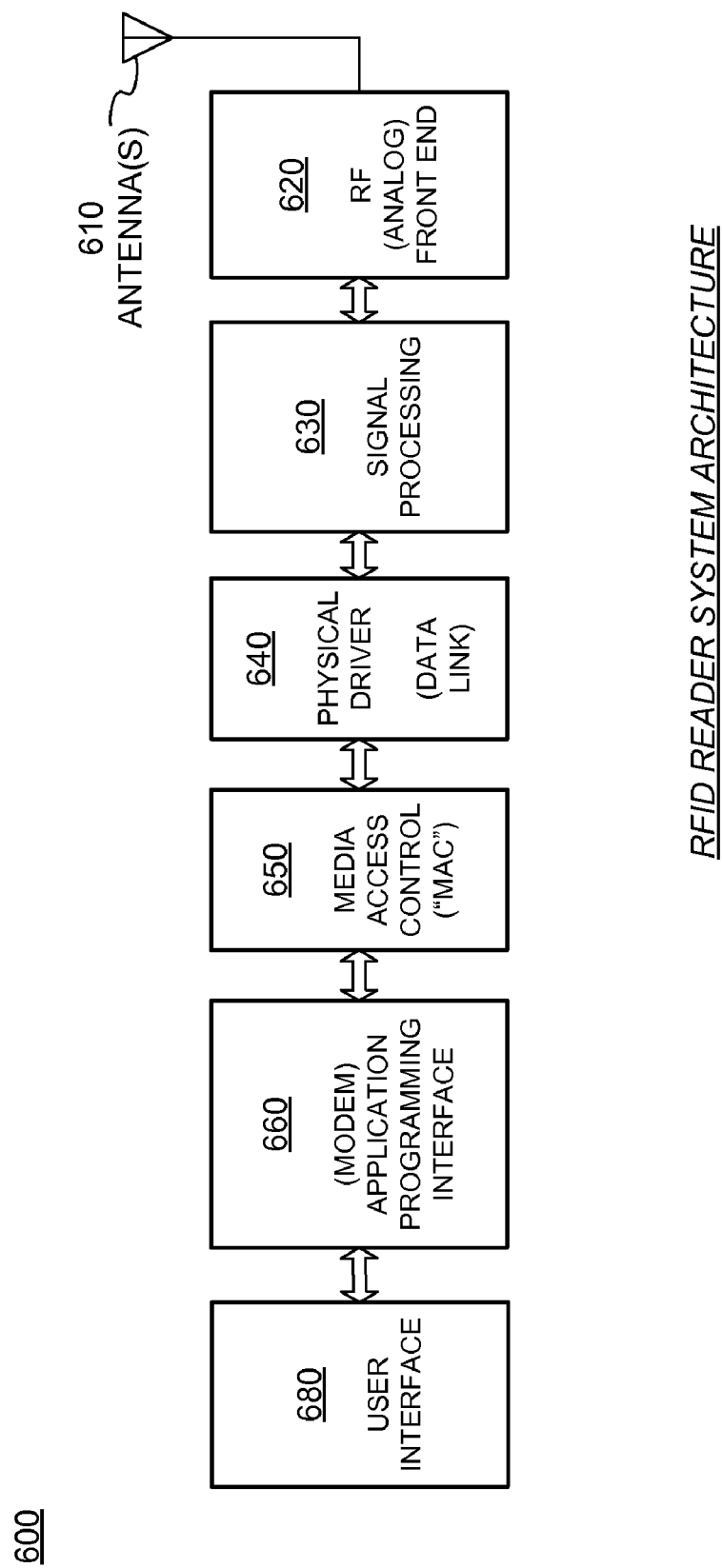
FIG. 6 is a block diagram illustrating an overall architecture of an RFID reader system according to embodiments.

FIG. 6 is a block diagram illustrating an overall architecture of an RFID reader system 600 according to embodiments. It will be appreciated that system 600 is considered subdivided into modules or components. Each of these modules may be implemented by itself, or in combination with others. It will be recognized that some aspects are parallel with those of FIG. 5. In addition, some of them may be present more than once.

RFID reader system 600 includes one or more antennas 610, and an RF Front End 620, for interfacing with antenna(s) 610. These can be made as described above. In addition, Front End 620 typically includes analog components.

System 600 also includes a Signal Processing module 630. In this embodiment, module 630 exchanges waveforms with Front End 620, such as I and Q waveform pairs. In some embodiments, signal processing module 630 is implemented by itself in an FPGA.

System 600 also includes a Physical Driver module 640, which is also known as Data Link. In this embodiment, module 640 exchanges bits with module 630. Data Link 640 can be the stage associated with framing of data. In one embodiment, module 640 is implemented by a Digital Signal Processor.

System 600 additionally includes a Media Access Control module 650, which is also known as MAC layer. In this embodiment, module 650 exchanges packets of bits with module 640. MAC layer 650 can be the stage for making decisions for sharing the medium of wireless communication, which in this case is the air interface. Sharing can be between reader system 600 and tags, or between system 600 with another reader, or between tags, or a combination. In one embodiment, module 650 is implemented by a Digital Signal Processor.

System 600 moreover includes an Application Programming Interface module 660, which is also known as API, Modem API, and MAPI. In some embodiments, module 660 is itself an interface for a user.

All of these functionalities can be supported by one or more processors. One of these processors can be considered a host processor. Such a processor would, for example, exchange signals with MAC layer 650 via module 660. In some embodiments, the processor can include applications for system 600. In some embodiments, the processor is not considered as a separate module, but one that includes some of the above-mentioned modules of system 600.

A user interface 680 may be coupled to API 660. User interface 680 can be manual, automatic, or both. It can be supported by a separate processor than the above mentioned processor, or implemented on it.

It will be observed that the modules of system 600 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 610 as signals, which are in turn processed successively by the various modules in the chain. Processing can terminate in any one of the modules. In a transmitting mode, initiation can be in any one of these modules. Ultimately, signals are routed internally, for antenna(s) 610 to transmit as wireless waves.

The architecture of system 600 is presented for purposes of explanation, and not of limitation. Its particular subdivision into modules need not be followed for creating embodiments according to the invention. Furthermore, the features of the invention can be performed either within a single one of the modules, or by a combination of them.

Figure 7:
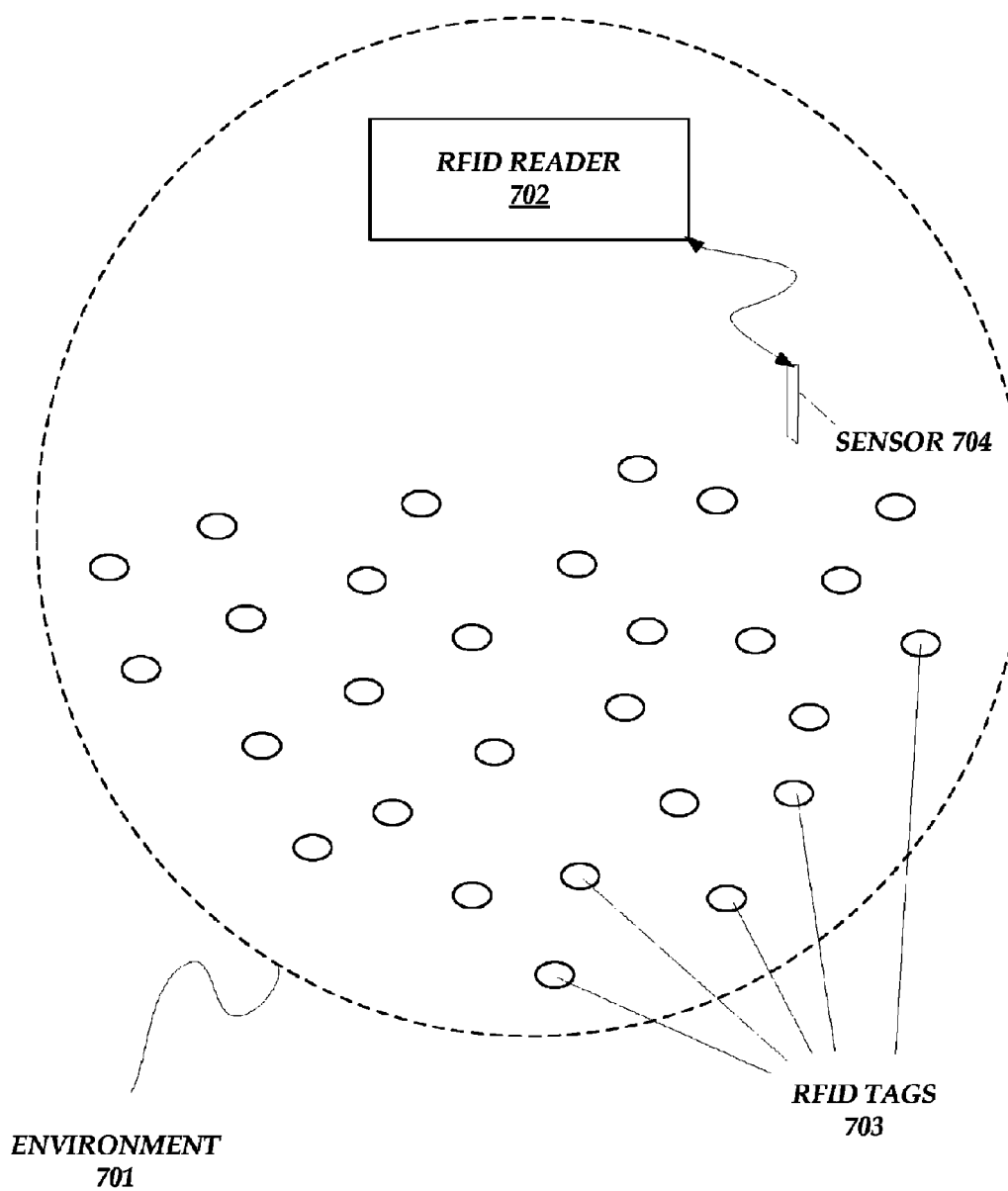
FIG. 7 is a diagram illustrating an environment of RFID tags, a sensor that senses the environment, and, an RFID reader that communicates with the RFID tags.

FIG. 7 shows an improved RFID reader system having a sensor 704 that senses an aspect of an environment 701 in which one or more RFID tags 703 reside. In an embodiment, the sensed aspect is recognized by an RFID reader 702 which subsequently determines an instruction for one or more of the tags 703 based on the sensed aspect. The RFID reader 702 then sends the instruction to the tag(s) 703. The processing of the instruction by the tag(s) adjusts the tag(s) for the environment 701. For instance, if the environment is sensed to be electromagnetically "noisy", the instruction can instruct the tag(s) to turn on one or more circuits to reduce the communication error rate. Other examples of the kinds of adjustments that may be made are described in more detail further below.

The sensing of an environment, determining of an appropriate instruction for that environment, and sending of the instruction to one or more tags may be performed in various ways. For instance, according to one embodiment, the sensor 704 is integrated with the RFID reader 702. That is, the sensor can be viewed as a component of the reader 702.

In alternate embodiments, the sensor 704 may be associated with another device other than the reader 702. For instance, the sensor 704 may be integrated with a computer and/or controller (not shown in FIG. 7) that is communicatively coupled to the reader 702 through a network. In one aspect of this approach, the computer and/or controller cause the sensed environmental aspect to be sent to the reader 702 through the network. In this case, the reader 702 determines the instruction and sends the instruction to the tag(s) 703. In another approach, the computer and/or controller determines an appropriate instruction and forwards it to the reader 702 (which forwards it to the tag(s)). In yet another approach, the sensed aspect is sent to another machine (such as another computer and/or controller) that determines the appropriate instruction for the tag(s). The machine then identifies the instruction to the reader 702 (e.g., by sending the instruction to the reader 702 over a network) and the reader 702 sends the instruction to the tag(s) 703. Here, the separate computer/controller/machine may be a reader controller that controls reader 702.

Various aspects of the environment 701 can be sensed. For instance, any one or more of the following can be sensed: 1) the electromagnetic noise within the environment; 2) the presence and/or the number of RFID readers within the environment; 3) the humidity within the environment; 4) the temperature within the environment; and, 5) the environment's electromagnetic reflection properties. Correspondingly, sensor 704 includes some kind of environmental sensor such as a receiver to sense noise, other readers and/or electromagnetic reflection properties of the environment. Sensor 704 may also include a humidity detector and/or a temperature detector.

Generally, the above environmental aspects have some bearing on the relative difficulty of a tag to successfully receive information, transmit information and/or perform internal operations. Generally, higher electromagnetic noise (e.g., from various transmitters that transmit into the environment 701), a larger number of readers, higher humidity (which causes the wireless transmission medium of the environment to become more "lossy"), higher temperature, and greater reflected electromagnetic energy within the environment cause communication between the reader 702 and the tag(s) 703 to become more difficult and/or challenging.

Appropriate tag adjustments for such difficult/challenging environmental conditions may include: 1) increasing or decreasing tag oscillator frequency (depending on the nature of the environmental condition); 2) changing the demodulation receive path from a single modulation scheme (in which one demodulator is used) to a dual demodulation scheme (in which two demodulators are used); 3) enabling a random generator (e.g., to increase available tag IDs); 4) increasing the power supply voltage on the tag, for instance, by increasing the efficiency of the tag's conversion of received electromagnetic energy into a power supply voltage (e.g., by enabling or increasing the efficiency of a rectifier circuit on the tag); 5) increasing the power supply voltage to specific tag sub-circuits (such as the tag's demodulators and/or modulator).

Other sensed environmental aspects that could warrant an operational adjustment to one or more tags may include: 1) the expected number of tags in the environment 701; and, 2) the velocity of a tag within the environment 701. In the case of the former, an increasing number of tags may signal a need for an increase in randomness (e.g., to increase the field of available tag ID values) and/or a need for encryption/decryption (e.g., to enable security features) and/or a need for an increase in the amount of available memory space on the tag. As such, if faced with a large number of tags, an appropriate tag adjustment may be to enable a random number generator (digital or analog), enable encryption/decryption logic and/or enable one or more of the tag's non volatile memory banks.

In the case of tag velocity, a tag may pass through the environment 701 "quickly". As such, in order to promote effective communication between the tag and reader 702 while the tag is within the environment 701, an appropriate tag adjustment may be to increase the speed of operation of the tag by, for example, increasing the supply voltage on the tag, increasing the frequency of the tag's oscillator and/or increasing the read and/or write times of a non volatile memory bank that resides on the tag. The later may be accomplished, for example, by increasing the gain of a charge pump circuit within the memory's write circuitry, and/or, increasing the gain of a sense amplifier within the memory's read circuitry.

In one embodiment, the number of tags and/or tag velocity are not sensed by a sensor—but rather—are "sensed" by being provided as an explicit input parameter (e.g., by a user or controller) that separately determines an appropriate value.

It is worthwhile to note that the reverse of everything said above is also largely (if not entirely) applicable. That is, for example, a decrease in the electrical noisiness and/or temperature of the environment may prompt tag oscillator frequency to be increased or decreased, demodulation scheme to be switched from dual mode to single mode, supply voltage to be lowered, etc Likewise, a decrease in the number of readers/ tags may prompt a tag's random generator, encryption/decryption and/or memory bank sub-circuits to be disabled. It is believed that the complete set of possibilities is so large that all of them cannot reasonably be described in the present specification. It is nevertheless believed, however, that given a specific environment those of ordinary skill will be able to readily ascertain an appropriate set of tag adjustments.

Figure 8:
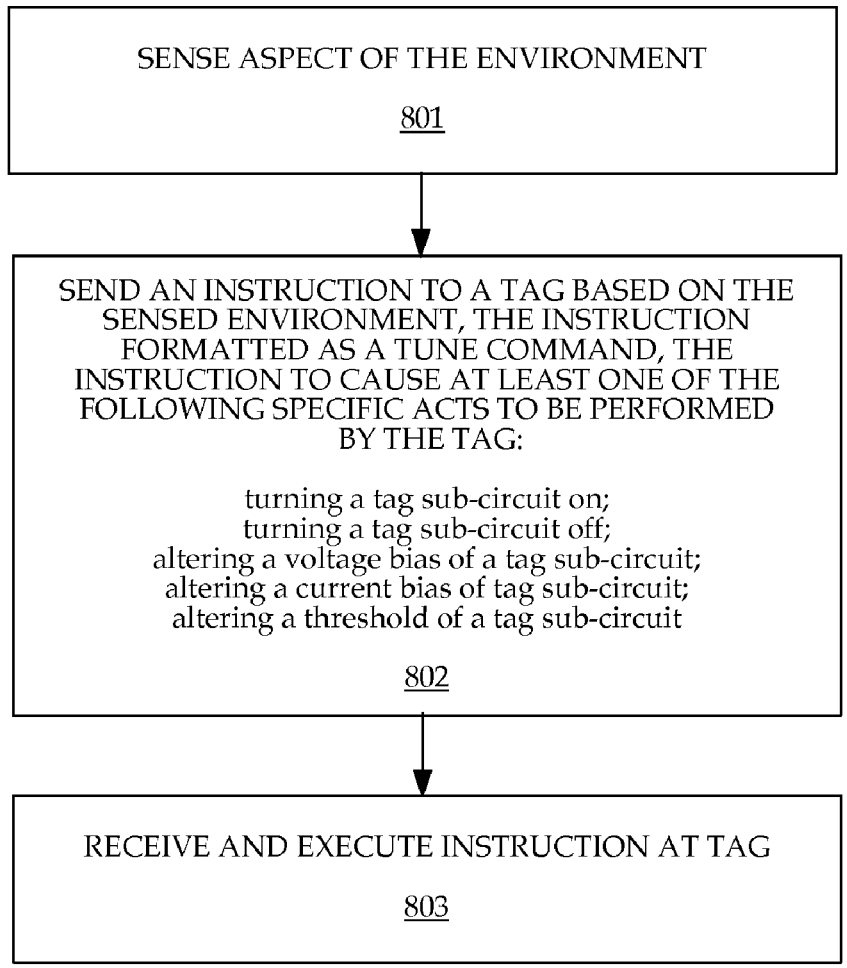
FIG. 8 is a flowchart illustrating a method that may be performed by the system of FIG. 7.

FIG. 8 shows an embodiment of a methodology 800 that may be performed by the reader system(s) discussed above. According to the methodology of FIG. 8, an aspect of the environment is sensed 801. Then, an instruction that is based on the sensed aspect is sent to one or more tags 802. The instruction is to cause the one or more tags to perform a specific act. As observed in FIG. 8, the specific act may include at least one of: i) turning a tag sub-circuit on; ii) turning a tag sub-circuit off; iii) altering a voltage bias of a tag sub-circuit; iv) altering a current bias of a tag sub-circuit; and, v) altering a threshold of a tag sub-circuit. Here, a tag sub-circuit is generally some identifiable sub portion of the tag's circuitry such as one or more of the following: a random number generator circuit; a demodulator or demodulator receive path circuit; a nonvolatile memory bank circuit; a modulator circuit; a encryption/decryption circuit; an oscillator circuit; a sense amplifier circuit; a rectifier circuit; and a charge pump circuit. The instruction that is sent to the tag may thus command the tag to turn on/off, alter a voltage and/or current bias of, and/or, alter a threshold of one or more specific tag sub-circuits.

In one embodiment, the instruction is formatted according to a Tune command format. Tune command formatting is discussed in more detail further below. After the one or more tags receive the instruction, the instruction is executed by the tag(s) to effect the adjustment 803. The immediately following discussion provides more specific details pertaining to the design of a tag to receive and put into effect a received instruction as described above.

FIG. 9A is a block diagram of an electrical circuit 924 according to embodiments. Circuit 924 may be formed in an IC of an RFID tag, such as IC 224 of FIG. 2. Circuit 924 has a number of main components that are described in this document. Circuit 924 may have a number of additional components from what is shown and described, or different components, depending on the exact implementation.

Circuit 924 includes at least two antenna connections 932, 933, which are suitable for coupling to one or more antenna segments (not shown in FIG. 9A). Antenna connections 932, 933 may be made in any suitable way, such as using pads and so on. In a number of embodiments more than two antenna connections are used, especially in embodiments where more antenna segments are used.

Circuit 924 includes a section 935. Section 935 may be implemented as shown, for example as a group of nodes for proper routing of signals. In some embodiments, section 935 may be implemented otherwise, for example to include a receive/transmit switch that can route a signal, and so on.

Circuit 924 also includes a Power Management Unit (PMU) 941. PMU 941 may be implemented in any way known in the art, for harvesting raw RF power received via antenna connections 932, 933. In some embodiments, PMU 941 includes at least one rectifier, and so on.

In operation, an RF wave received via antenna connections 932, 933 is received by PMU 941, which in turn generates power for components of circuit 924. This is true for either or both reader-to-tag (R→T) and tag-to-reader (T→R) communication, whether or not the received RF wave is modulated.

Circuit 924 additionally includes a demodulator 942. Demodulator 942 demodulates an RF signal received via antenna connections 932, 933. Demodulator 942 may be implemented in any way known in the art, for example including an attenuator stage, an amplifier stage, and so on.

Circuit 924 further includes a processing block 944. Processing block 944 receives the demodulated signal from demodulator 942, and may perform operations. In addition, it may generate an output signal for transmission.

Processing block 944 may be implemented in any way known in the art. For example, processing block 944 may include a number of components, such as a processor, memory, a decoder, an encoder, a state machine, and so on.

Circuit 924 additionally includes a modulator 946. Modulator 946 modulates an output signal generated by processing block 944. The modulated signal is transmitted by driving antenna connections 932, 933, and therefore driving the load presented by the coupled antenna segment or segments. Modulator 946 may be implemented in any way known in the art, for example including a driver stage, amplifier stage, and so on.

In one embodiment, demodulator 942 and modulator 946 may be combined in a single transceiver circuit. In another embodiment, modulator 946 may include a backscatter transmitter or an active transmitter. In yet other embodiments, demodulator 942 and modulator 946 are part of processing block 944.

Circuit 924 additionally includes a memory 950, which stores data. Memory 950 is preferably implemented as a Nonvolatile Memory (NVM), which means that the stored data is retained even when circuit 924 does not have power, as is frequently the case for a passive RFID tag.

FIG. 9A also shows additional circuit structures that support the execution of an instruction aimed at changing the operation of one or more of the tag's sub-circuits so that the tag can be adjusted for its environment as discussed above with respect to FIGS. 7 and 8. Specifically, FIG. 9A shows control signal lines 960, 970, 980, 990 respectively flowing to the demodulator 942, PMU 941, modulator 946, and memory 950 sub-circuits. Note that memory 950 may be composed of individual memory banks one or more of which may have dedicated control signal lines.

In operation, a RF signal is received through the receive part of the tag's transceiver that contains the instruction to adjust the tag for its environment. The processing block 944 interprets the command and sends one or more signals over appropriate control signal lines to effect the adjustment (e.g., processing block sends a signal over control signal line 960 if the demodulator 942 is to be adjusted).

For illustrative ease, FIG. 9A does not depict other specific sub-circuits whose operation can be changed to effect an environmentally based adjustment. Examples of such sub-circuits include an oscillator, a rectifier circuit (which may be presumed to be within PMU 941), an analog random number generator, a digital random number generator, encryption/decryption logic, charge pump circuitry (e.g., within write circuitry of memory 950) and sense amplifier circuitry (e.g., within read circuitry of memory 950). Although not depicted, each such sub-circuit may have its own dedicated control signal line from the processing block 944 consistent with the architectural approach observed in FIG. 9A.

As alluded to above, the specific change made to a sub-circuit may include at least one of: i) turning the sub-circuit on; ii) turning the sub-circuit off; iii) altering a voltage bias of the sub-circuit; iv) altering a current bias of the sub-circuit; and, v) altering a threshold of the sub-circuit. Enablement/disablement circuitry can be coupled to a control signal line to turn a sub-circuit on/off. For example, enablement/disablement circuitry can be coupled to memory control signal line 990 to turn memory 950 (or a memory bank of memory 950) on/off. Enablement/disablement circuitry can be, for example, circuitry designed to connect/cutoff any of a sub-circuit's power supply voltage, a clock signal that is fed to the sub-circuit, or an input signal that is provided to the sub-circuit.

With respect to bias adjustments, generally, a sub-circuit can be viewed as an arrangement of transistors that are interconnected so as to perform the sub-circuit's function. The arrangement of transistors can be viewed as having a substantially time invariant (e.g., "DC") operating point that corresponds to the nominal bias of the circuit when a power supply voltage is supplied to it. For instance, for a given supply voltage, the nominal bias may be the DC voltages that appear at various nodes in the sub-circuit and DC currents that flow through specific current paths in the sub-circuit. When a time-varying signal is provided at an input to the sub-circuit, the voltages and currents may swing or otherwise deviate from these bias points.

Adjustment of a voltage and/or current bias within a sub-circuit may be undertaken, for example, to change a fundamental operating property of a sub-circuit. For instance, by changing a voltage and/or current bias within a sense amp, the gain of the sense amp may be made to change. Likewise, changing a voltage and/or current bias within an oscillator can cause an oscillator to change its oscillation frequency. As just one more example, a bias voltage and/or bias current change may be applied to a random number generator circuit to change the randomness of its output.

A threshold may also be adjusted within a sub-circuit. For instance, for sub-circuits that make binary decisions, a threshold may be changed to adjust the level at which the sub-circuit decides a signal corresponds to a "1" or a "0". As just a few examples, the demodulator 942 or a sense amplifier within a memory bank may have an internal threshold level changed to a higher value in the presence of a noisy environment (or lowered in the presence of a quiet environment). Generally, any circuit can be made to change some principle or feature of its operation by changing its voltage bias, current bias and/or a threshold within the sub-circuit. Voltage bias adjustment circuitry, current bias adjustment circuitry and/or threshold adjustment circuitry may include one or more transistors that are coupled to a bias point or threshold circuit and designed to impart a change thereto.

FIG. 9B shows another tag design which concentrates at least some of the circuitry that puts into effect an environmentally based adjustment into the PMU. For instance, for those environmentally based adjustments that require a sub-circuit's supply voltage to be adjusted, the PMU may be invoked to make the change. In this case, for example, the processing block interprets the received instruction and sends a command to PMU along control signal line 971. The PMU receives and interprets the control signal from line 971 and adjusts the supply voltage of the indicated sub-circuits. For example, the supply voltage of the demodulator and modulator can be changed, connected or cutoff along control signal lines 972 and 973, respectively. The supply voltages of any of the other sub-circuits could be controlled in this manner. Conceivably, bias or threshold adjustments could also be effected from the PMU.

Figure 9C:
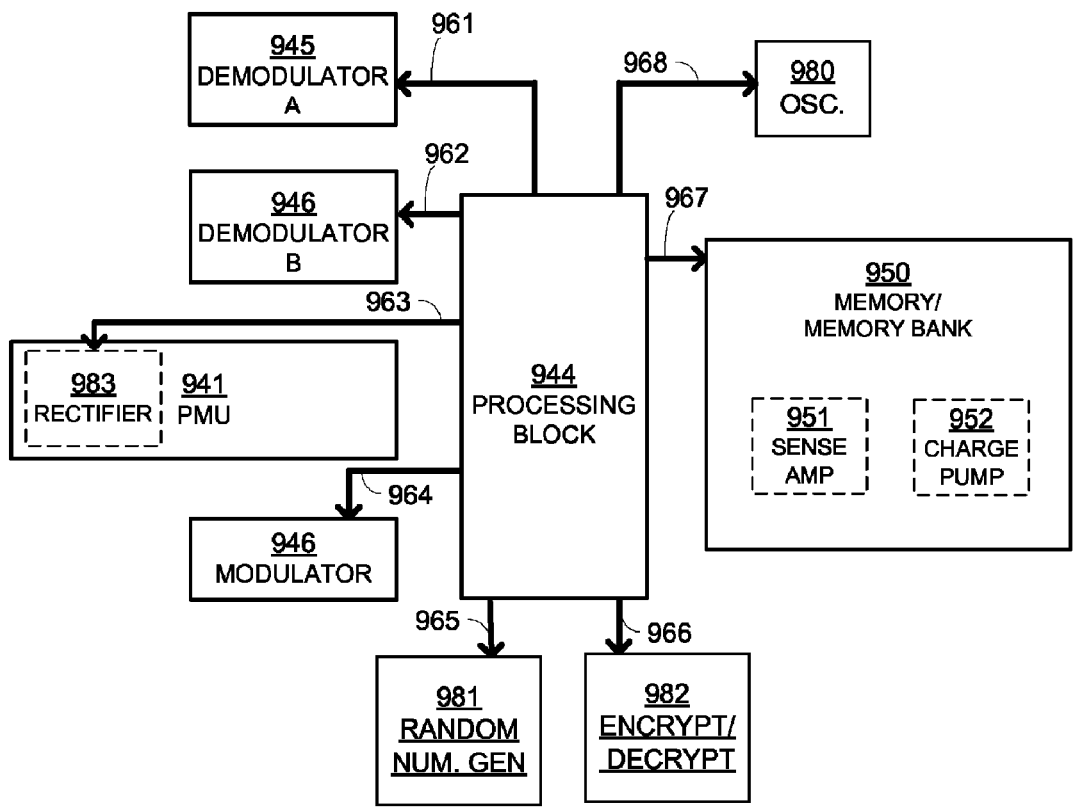
FIG. 9C is a diagram illustrating a third embodiment showing different sub-circuits whose operation may be adjusted based on a sensed aspect of an environment.

FIG. 9C depicts a tag embodiment showing each of the sub-circuits mentioned above whose operation is capable of being adjusted in response to receipt of an instruction that was determined based on a sensed aspect of an environment. For ease of drawing, other tag components (such as the antennas and various interconnections) have been omitted. FIG. 9C shows a pair of demodulators 945, 946 having respective control signal lines 961, 962. As discussed above, a sensed environmental aspect may trigger dual mode demodulation (in which case both demodulators 945, 946 are enabled) or single mode demodulation (in which case one of the demodulators may be enabled and the other disabled).

FIG. 9C also shows a rectifier 983 that may, for example, be enabled/disabled and/or have its power conversion efficiency adjusted through control signal line 963. A modulator 946 is also shown that may be enabled/disabled and/or have its modulation response adjusted through control signal line 964. The operation of random number generator 981 and encryption/decryption logic 982 may also be respectively adjusted (e.g., enabled/disabled) through control signal lines 965 and 966. Sense amplifier 951 and charge pump 952 are associated with memory/memory bank 950 and may be adjusted (e.g., by changing their respective gains) in any of the ways discussed above. Likewise, oscillator 980 may be adjusted (e.g., by changing its oscillation frequency) through control signal line 968. FIG. 9C adopts the approach of FIG. 9A in which the control signal lines 961-968 flow from the processing block 944. Alternatively, completely or partially, the approach of FIG. 9B may be adopted in which the PMU 941 provides control signals over corresponding control lines to various sub-circuits.

Environmentally based instructions are preferably sent to one or more tags according to Tune command format. As described in previously filed U.S. patent application Ser. No. 12/112,699, filed Apr. 30, 2008, and entitled RFID TAG CHIPS AND TAGS CAPABLE OF BACKSCATTERING MORE CODES AND METHODS, a Tune command can be used to encode a specific instruction.

The Tune command can be implemented as a custom command that is not specified in a particular communication protocol (e.g., Gen2), and, made by a sequence of bits chosen so that they do not conflict with other commands of the protocol. Here, a specific environmentally driven instruction to perform one or more specific acts to one or more of a tag's sub-circuits can be implemented as a command with a custom payload where the payload is used to distinguish among different custom commands (e.g., different environmentally driven specific acts to be performed), and, further transfer a parameter for the commands (e.g., the specific one or more sub-circuits to which a custom command is to be applied).

The section in the payload used for carrying Tune formatted instructions can be a mask field, according to embodiments. For the Gen2 Spec, two such Gen2 commands that can transport a Tune formatted custom command are the Select command and the BlockWrite command. Between these two candidate commands, it should be considered that the Select command can be transmitted before or after a tag is singulated out of its population, while the BlockWrite is better suited for singulated tags. In addition, the BlockWrite command is optional to the Gen2 Spec, and the tag would probably have to have a controller that can accept it.

Each one of the custom commands can thus be constructed as an implementation of this Select command or the BlockWrite command. An example is now described in terms of the Select command, but would apply equally to the BlockWrite command. Furthermore, embodiments are not limited to the Tune command or its derivatives described here. A command carrying instructions for different environmentally driven specific acts to be performed by tag circuits may be formatted and/or named differently than the specific Tune command discussed herein.

FIG. 10A is a table illustrating the fields of the Select command of the Gen2 Spec. Version 1.1.0 of the Gen2 Spec is hereby incorporated by reference in its entirety. The fields of this Select command are explained in more detail in the above mentioned Gen2 Spec. In addition, the implementation of this Select command can have a custom payload so that it operates as a Tune formatted command.

FIG. 10B is a table illustrating how a number of custom commands can be enabled in a reader and a tag. EBV stands for Extensible Bit Vector. The Mask Field can be partitioned as shown, into two primary subfields, named FEF and FCF.

The Feature Enabling Field (FEF) enables the tag to verify that it is a proper recipient for the command, by comparing the transmitted FEF value against a value in Membank. In this case, Membank can be EPC, TID or USER memory. As can be seen, the FEF can be further partitioned into subfields for better clarity. Such subfields might include, for example if Membank is TID memory as described in Gen2 v1.1.0, a Class Identifier, the MDID, and an Indicator Bit.

The Class Identifier can be two bits. For example, EPCglobal can correspond to a value of 10. This would allow the custom command to apply, for example, only to EPCglobal tags.

The MDID is the tag manufacturer's ID, which is stored in the tag's TID memory. For Impinj tags, this number is 000000000001 or 100000000001. The MDID allows a reader to select tags of only the manufacturer of interest. So, even if this Select command is transmitted and received before singulation, the Select command can select also according to the tag manufacturer's ID. This will cause the manufacturer's tags to be selected, and thus the reader can ensure prior knowledge of the tag manufacturer's identification.

The Indicator Bit can be set to 0 or 1. In the Gen2 spec, a tag model number follows the MDID. A bit of this model number can serve as the Indicator Bit, and can be interpreted as follows: If it is 0, the tags can interpret the command as an "ordinary" Select, and execute it per the Gen2 spec. Else, if it is 1, the tags can interpret the Select command as a custom instruction, and execute according to the FCF.

The Feature Command Field (FCF) can have a command code that indicates the number of the custom command. For example, a command code of 00000 could be a first custom command. A 5-bit field permits 32 possible custom commands. A command code of 11111 could indicate an extended command field that extends into the subsequent data field, allowing more than 32 custom commands. The data field can also contain data needed to implement the custom instruction and its meaning will derive from the command code. For example, the sub-circuit identifier of the Tune command can be encoded as data in the FCF subfield shown in FIG. 10.

Thus, a Tune formatted command corresponds to a custom instruction having a command code portion (e.g., as in the first part of the FCF field) and a data portion (e.g., as in the second part of the FCF field). Thus, for instance, the environmentally driven custom command code could be embedded in the first part of the FCF field and be interpreted as any one or more of: turn a sub-circuit on, turn a sub-circuit off, adjust a sub-circuit voltage bias, adjust a sub-circuit current bias, or adjust a sub-circuit threshold. The specific sub-circuit or set of sub-circuits to which the command code specified in the first portion are to be applied to may be identified in the second, data portion.

In some embodiments, the tag may ignore the Target and Action field in the Select command, depending on whether these fields are relevant. In other embodiments, the tag may also set the appropriate Target flag.

In preferred embodiments, the entire Select command must be valid for the tag to accept and execute the custom command. That means valid values for Membank, Length, Pointer, Mask, CRC-16, etc.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A semiconductor chip for an RFID tag, comprising:
a wireless transceiver;
at least one sub-circuit comprising one of a random number generator, a demodulator receive path, a nonvolatile memory bank, a modulator, an encryptor, a decryptor, an oscillator, a sense amplifier, a rectifier, and a charge pump; and
a processing block circuitry configured to;
receive, from a reader, an instruction encoded in a TUNE command, the instruction associated with an aspect of an environment sensed by the reader, and
execute the instruction causing circuitry coupled to a power management unit to perform at least one of:
turn the at least one sub-circuit on,
turn the at least one sub-circuit off,
alter a bias current within the at least one sub-circuit,
alter a bias voltage within the at least one sub-circuit, and
adjust a threshold within the at least one sub-circuit.

2. The semiconductor chip of claim 1, wherein the sub-circuit includes the sense amplifier within a memory bank read circuit.

3. The semiconductor chip of claim 1, wherein the sub-circuit includes the charge pump within a non-volatile memory bank write circuit.

4. The semiconductor chip of claim 1, wherein the sub-circuit includes the rectifier circuit within the power management unit.

5. The semiconductor chip of claim 1, wherein the sub-circuit includes the demodulator receive path with two demodulators and the circuitry is configured to cause the demodulators to enter a dual demodulation mode.

6. A method, comprising
receiving, at an RFID tag semiconductor chip from a reader, an instruction encoded in a Tune command, the instruction associated with an aspect of an environment sensed by the reader said instruction to perform at least one specific act, wherein the semiconductor chip includes at least one sub-circuit comprising one of a random number generator, a demodulator receive path, a nonvolatile memory bank, a modulator, an encryptor, a decryptor, an oscillator, a sense amplifier, a rectifier, and a charge pump;
executing the instruction causing circuitry coupled to a power management unit to perform at least one of:
turn the at least one sub-circuit on,
turn the at least one sub-circuit off,
alter a bias current within the at least one sub-circuit,
alter a bias voltage within the at least one sub-circuit, and
adjust a threshold within the at least one sub-circuit.

7. The method of claim 6, wherein the sub-circuit includes the sense amplifier and the circuitry is further configured to alter the sense amplifier's gain.

8. The method of claim 6, wherein the sub-circuit includes the charge pump and the circuitry is further configured to alter the charge pump's gain.

9. The method of claim 6, wherein the sub-circuit includes the rectifier and the circuitry is further configured to alter the semiconductor chip's electromagnetic/electrical power conversion efficiency.

10. The method of claim 6, wherein the sub-circuit includes the oscillator and the circuitry is further configured to alter the oscillator's oscillation frequency.

11. The method of claim 6, wherein the sub-circuit includes the demodulator receive path with two demodulators, and wherein the circuitry is further configured to cause the demodulators to enter a dual demodulation mode.

12. An RFID tag, comprising:
an antenna; and,
a semiconductor chip, the semiconductor chip comprising:
a wireless transceiver;
at least one sub-circuit comprising one of a random number generator, a demodulator receive path, a non-volatile memory bank, a modulator, an encryptor, a decryptor, an oscillator, a sense amplifier, a rectifier, and a charge pump; and
a processing block circuitry configured to:
receive, from a reader, an instruction encoded in a TUNE command, the instruction associated with an aspect of an environment sensed by the reader, and
execute the instruction causing circuitry coupled to a power management unit to perform at least one of:
turn the at least one sub-circuit on,
turn the at least one sub-circuit off,
alter a bias current within the at least one sub-circuit,
alter a bias voltage within the at least one sub-circuit, and
adjust a threshold within the at least one sub-circuit.

13. The RFID tag of claim 12, wherein the sub circuit includes the sense amplifier within a memory bank read circuit.

14. The RFID tag of claim 12, wherein the sub circuit includes the charge pump within a non-volatile memory bank write circuitry.

15. The RFID tag of claim 12, wherein the sub circuit includes the rectifier within the power management unit.

16. The RFID tag of claim 12, wherein the sub circuit includes the demodulator receive path and said demodulator receive path with two demodulators and the circuitry is configured to cause the demodulators to enter a dual demodulation mode.

17. The semiconductor chip of claim 1, wherein the aspect of the environment includes at least one of: electromagnetic noise, presence of at least one other reader, a number of other readers, humidity, temperature, and electromagnetic reflection properties in the environment.

18. The method of claim 6, wherein the aspect of the environment includes at least one of: electromagnetic noise, presence of at least one other reader, a number of other readers, humidity, temperature, and electromagnetic reflection properties in the environment.

19. The RFID tag of claim 12, wherein the aspect of the environment includes at least one of:
electromagnetic noise, presence of at least one other reader, a number of other readers, humidity, temperature, and electromagnetic reflection properties in the environment.

\* \* \* \* \*

UNITED STATES PATENT AND TRADEMARK OFFICE
CERTIFICATE OF CORRECTION

| | | |
|---|---|---|
| PATENT NO. | : 8,115,632 B1 | |
| APPLICATION NO. | : 12/370503 | |
| DATED | : February 14, 2012 | |
| INVENTOR(S) | : Rahimi et al. | |

It is certified that error appears in the above-identified patent and that said Letters Patent is hereby corrected as shown below:

1) Please, delete "Inc,," in First Page Col. 1 (Assignee), line 1, and insert -- Inc., --, therefor.

2) Please, delete "etc" in column 11, line 1, and insert -- etc. --, therefor.

3) In Claim 1, delete "to;" in column 16, line 25, and insert -- to: --, therefor.

4) In Claim 14, delete "circuitry." in column 18, line 12, and insert -- circuit. --, therefor.

Signed and Sealed this
Nineteenth Day of June, 2012

David J. Kappos
*Director of the United States Patent and Trademark Office*